(12) United States Patent
Gilliam et al.

(10) Patent No.: US 12,304,441 B2
(45) Date of Patent: May 20, 2025

(54) AIR COMPRESSOR LOAD MANAGEMENT SYSTEM AND METHOD INCLUDING AN AIR COMPRESSOR LOAD CONTROL DEVICE

(71) Applicant: Air Production & Services Inc., Pembroke, NC (US)

(72) Inventors: Charles R. Gilliam, Ellerbe, NC (US); Kiel L. Locklear, Pembroke, NC (US)

(73) Assignee: Air Production & Services Inc., Pembroke, NC (US)

( * ) Notice: Subject to any disclaimer, the term of this patent is extended or adjusted under 35 U.S.C. 154(b) by 681 days.

(21) Appl. No.: 17/672,042

(22) Filed: Feb. 15, 2022

(65) Prior Publication Data
US 2022/0314955 A1    Oct. 6, 2022

Related U.S. Application Data

(60) Provisional application No. 63/168,354, filed on Mar. 31, 2021.

(51) Int. Cl.
*B60T 17/22*    (2006.01)
*B60T 13/26*    (2006.01)
*B60T 13/68*    (2006.01)

(52) U.S. Cl.
CPC .......... *B60T 17/228* (2013.01); *B60T 13/26* (2013.01); *B60T 13/683* (2013.01);
(Continued)

(58) Field of Classification Search
CPC ...... B60T 13/665; B60T 17/228; B60T 15/16; B60T 13/683; B60T 17/221; B60T 2270/406; B60T 2270/88
See application file for complete search history.

(56) References Cited

U.S. PATENT DOCUMENTS 3,845,991 A * 11/1974 Engle .................... B60T 13/665
303/3
4,344,138 A *  8/1982 Frasier ................. B60T 8/1705
303/20
(Continued)

FOREIGN PATENT DOCUMENTS

WO    WO-2019235583 A1 * 12/2019 ............. B01D 46/00

OTHER PUBLICATIONS

DE 2618440 A1 (Nov. 10, 1977) (Year: 1977).*
(Continued)

*Primary Examiner* — Robert A. Siconolfi
*Assistant Examiner* — Mahbubur Rashid
(74) *Attorney, Agent, or Firm* — Ward and Smith, P.A.; Ryan K. Simmons

(57) ABSTRACT

An air compressor load management device. The air compressor load management device may include a supply air inlet; a first valve; a controller; a sensor; a regulator; a second valve; a supply air outlet; and a sensing line, wherein the sensor is configured to sense an air pressure at the supply air outlet, and wherein depending on the sensed air pressure at the supply air outlet the sensor signals the controller to cause the first valve to one of send air received from the supply air inlet to the regulator, send air received from the supply air inlet directly to the second valve via the full pressure air line, or to not send any air.

20 Claims, 8 Drawing Sheets

(52) U.S. Cl.
CPC ....... *B60T 17/221* (2013.01); *B60T 2270/406* (2013.01); *B60T 2270/88* (2013.01)

(56) References Cited

U.S. PATENT DOCUMENTS

| | | | | |
|---|---|---|---|---|
| 6,024,419 | A * | 2/2000 | Waldrop | B60T 13/665 |
| | | | | 303/3 |
| 6,036,449 | A * | 3/2000 | Nishar | B60K 25/00 |
| | | | | 417/292 |
| 6,079,436 | A * | 6/2000 | Delfs | B60T 17/02 |
| | | | | 137/115.19 |
| 6,205,853 | B1 * | 3/2001 | Dei | G01M 3/2853 |
| | | | | 73/168 |
| 7,866,760 | B2 * | 1/2011 | Detlefs | B60T 13/26 |
| | | | | 303/9.66 |
| 8,640,533 | B2 * | 2/2014 | Andersen | B60T 13/263 |
| | | | | 73/129 |
| 8,651,585 | B2 * | 2/2014 | Kaminski | B60T 7/06 |
| | | | | 303/3 |
| 9,352,736 | B2 * | 5/2016 | Mayer | G01L 5/28 |
| 10,843,676 | B2 * | 11/2020 | Heller | B60T 17/228 |
| 2008/0257656 | A1 * | 10/2008 | Skinner | H04B 10/1121 |
| | | | | 188/1.11 E |
| 2017/0240157 | A1 * | 8/2017 | Heller | B60T 17/228 |

OTHER PUBLICATIONS

DE 19515895 A1 (Oct. 31, 1996) (Year: 1996).*
CN 202204685 U (Apr. 25, 2012) (Year: 2012).*
CN 102421647 B (Dec. 2, 2015) (Year: 2015).*
DE 112015006830 T5 (May 24, 2018) (Year: 2018).*
CN 105398442 B (Apr. 7, 2020) (Year: 2020).*
EP 3808619 A1 (Apr. 21, 2021) (Year: 2021).*

* cited by examiner

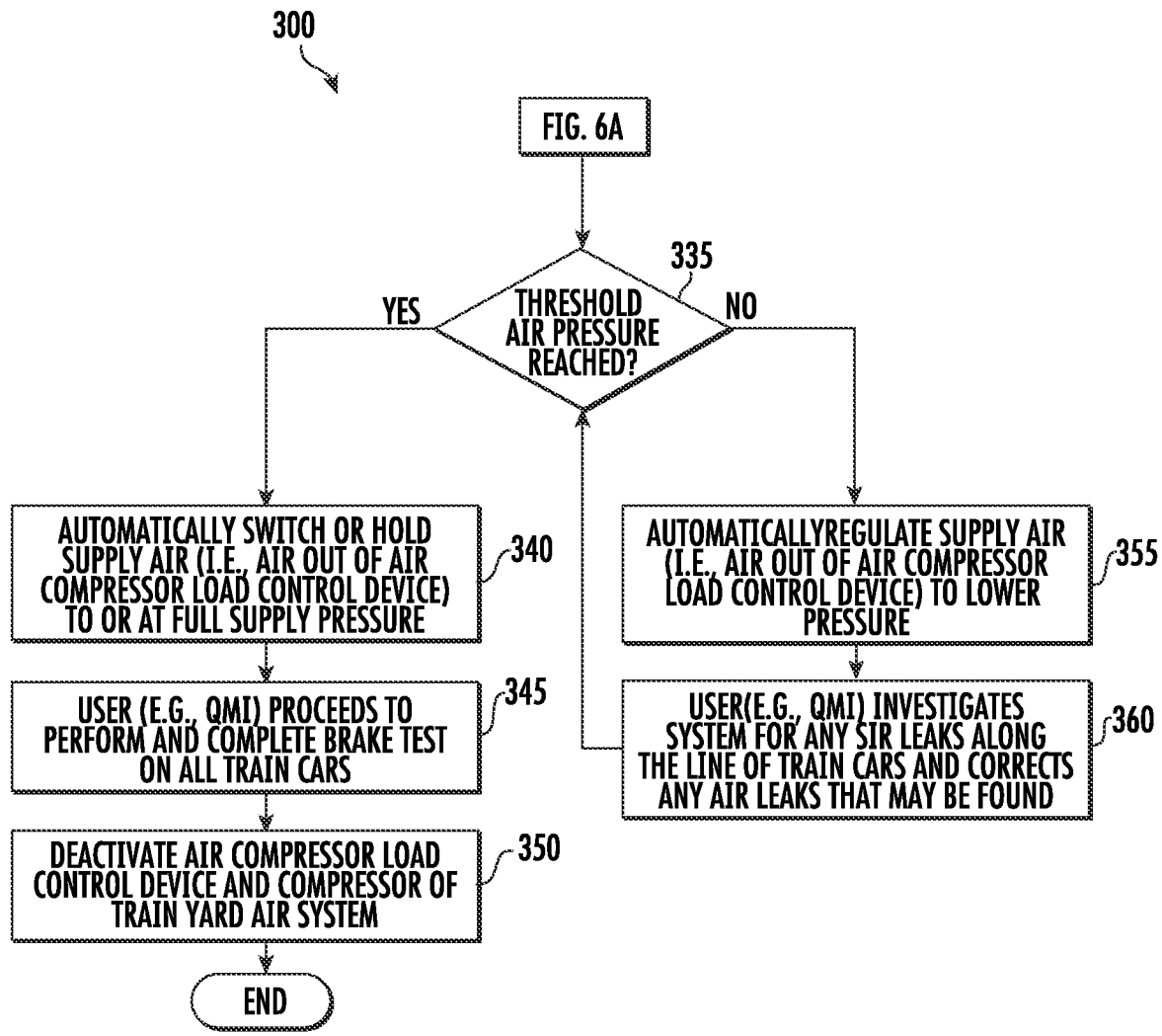

AIR COMPRESSOR LOAD MANAGEMENT SYSTEM AND METHOD INCLUDING AN AIR COMPRESSOR LOAD CONTROL DEVICE

RELATED APPLICATIONS

This application claims priority to U.S. Provisional Patent Application Ser. No. 63/168,354 filed on Mar. 31, 2021, the disclosure of which is incorporated herein by reference in its entirety.

TECHNICAL FIELD

The presently disclosed subject matter relates generally to brake testing systems and more particularly to an air compressor load management system and method including an air compressor load control device for use in train car brake testing.

BACKGROUND

All freight trains must receive a brake test, called an Initial Terminal Test or Class 1 test, before leaving a terminal to ensure that 100% of the brakes are working on the individual cars. This test is typically performed by a Qualified Mechanical Inspector (QMI) and can be performed without the locomotives through use of a Yard Air System.

When performing Class 1 brake tests and inspections, many QMI's prefer to "carry air" with them as they couple train-line hoses (air hoses between cars) and perform the initial inspection. Carrying air, or turning the air supply on and allowing it to vent to atmosphere, aids the inspector in quickly identifying train-line obstructions, potential leaks, or wrongly positioned valves.

One problem with carrying air is that compressed air is vented directly to atmosphere until all of the hoses are coupled and the train-line is solid. Venting compressed air to atmosphere is costly. Power consumption is increased by the compressor running at full load for extended periods of time, the compressor will require more maintenance, and life cycle of the compressor will be shortened.

SUMMARY

In one embodiment, air compressor load control device is provided. The air compressor load control device may include a supply air inlet; a first valve in fluid communication with the supply air inlet; a controller in operative communication with the first valve; a sensor in operative communication with the controller; a regulator in fluid communication with a first outlet of the first valve; a second valve in fluid communication with an outlet of the regulator via a first inlet of the second valve, and the second valve further in fluid communication with a second outlet of the first valve via a second inlet of the second valve; a supply air outlet in fluid communication with an outlet of the second valve; and a sensing line in fluid communication with the supply air outlet at a first end and the sensor at a second end, wherein the sensor is configured to sense an air pressure at the supply air outlet, and wherein depending on the sensed air pressure at the supply air outlet the sensor signals the controller to cause the first valve to one of send air received from the supply air inlet to the regulator, send air received from the supply air inlet directly to the second valve, or to not send any air. The controller may be configured to automatically cause the first valve to direct air received from the supply air inlet to the regulator based on the sensor sensing the air pressure at the supply air outlet is below a pre-set pressure threshold, wherein the regulator regulates down the air pressure of air at the supply air outlet to a pre-set reduced air pressure. The pre-set pressure threshold may be an air pressure indicative of the supply air exiting the supply air outlet being vented to atmosphere. The controller may be configured to automatically cause the first valve to direct air received from the supply air inlet to the second valve based on the sensor sensing the air pressure at the supply air outlet is at or above a pre-set pressure threshold. The controller may be configured to automatically cause the first valve to not send any air received from the supply air inlet based on the sensor sensing the air pressure at the supply air outlet is below a pre-set pressure threshold for a pre-set amount of time. The first valve may include a main valve and the second valve may include a shuttle valve. The air supply air inlet may be in fluid communication with a compressed air supply reservoir. The second valve may be configured to provide an air pathway from one of either the regulated pressure air line or the full pressure air line, while closing the air pathway of the other one of the regulated pressure air line or the full pressure air line. The first valve selectively provides one of a full or a pre-set pressure supply air path, a regulated pressure supply air path, or a closed supply air path. The air compressor load control device may further include an on/off valve, wherein when the on/off valve is set to off the first valve is automatically set to not send any air, and when the on/off valve is set to on a signal is sent to the sensor and controller to operate the device and the first valve is automatically set to send air to the regulator or directly to the second valve based on the sensed air pressure at the supply air outlet. The air compressor load control device of may further include at least one of a first adjuster operatively connected to the sensor for adjusting the pre-set pressure threshold, and a second adjuster operatively connected to the regulator for adjusting the pre-set reduced air pressure. The air outlet may be configured to operatively engage with a brake testing device. The first inlet of the second valve is connected to the outlet of the regulator via a regulated pressure air line, and the second inlet of the second valve is connected to the second outlet of the first valve via a full pressure air line. The air compressor load control device may further include a communications interface, wherein the communications interface may be configured for connecting to a network for communicating data with a computing device and/or a networked computer.

In another embodiment, an air compressor load management system is provided. The air compressor load management system may include a compressed supply air reservoir; and an air compressor load control device in fluid communication with the compressed supply air reservoir. The air compressor load management system may further include a brake testing device operatively connected to the supply air outlet. The brake testing device may include a train brake testing device. The air compressor load management system may further include an air compressor operatively engaged with the compressed supply air reservoir, wherein the air compressor may be configured to charge the compressed supply air reservoir. The air compressor load control device may further include a communications interface, wherein the communications interface may be configured for connecting to a network for communicating data with a computing device and/or a networked computer. The air compressor load management system may further include one or more computing devices and a networked computer, wherein the one or more computing devices and networked computer may be in communication via a network.

In yet another embodiment, a method of using an air compressor load management system is provided. The method may include providing an air compressor load control device; connecting the air compressor load control device to a compressed air supply at the supply air inlet and to a main air line at the supply air outlet; connecting the main air line to a brake system to be tested; charging the air compressor load management system; and conducting a brake test. The method may further include the air compressor load control device automatically sensing an air pressure at the supply air outlet, and wherein depending on the sensed air pressure sending regulated pressure air, full pressure air, or no air out the supply air outlet.

Certain aspects of the subject matter of the invention having been stated hereinabove, which are addressed in whole or in part by the disclosed subject matter, other aspects will become evident as the description proceeds when taken in connection with the accompanying Examples and Drawings as best described herein below.

BRIEF DESCRIPTION OF THE DRAWINGS

Figure 1:
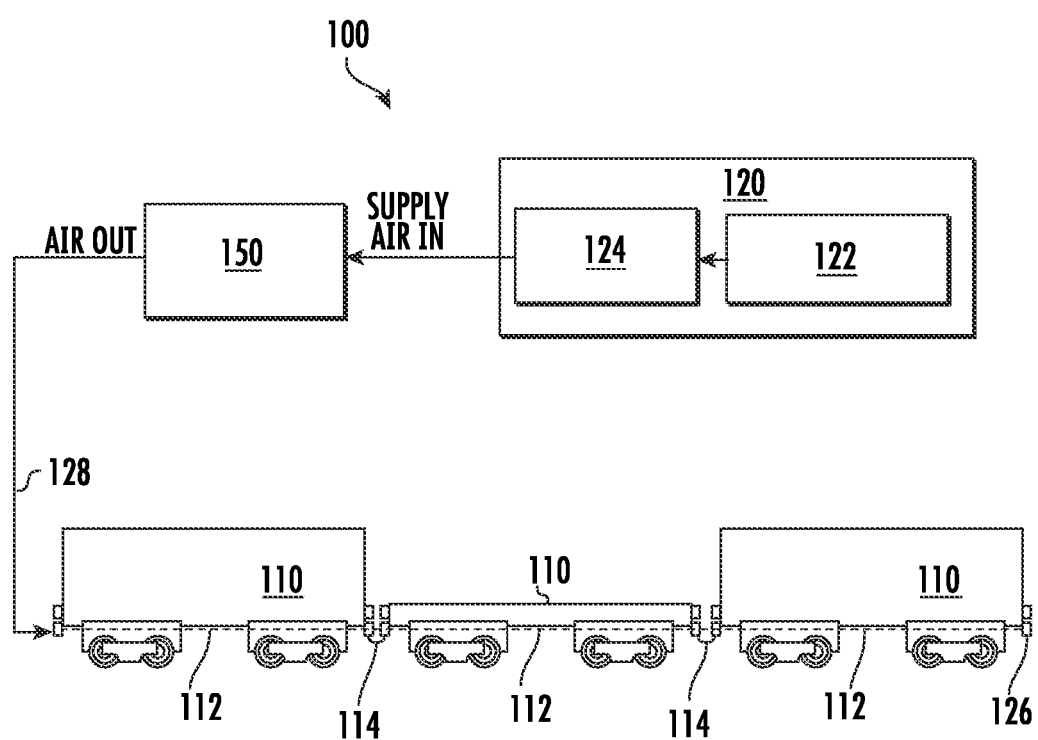
Figure 2:
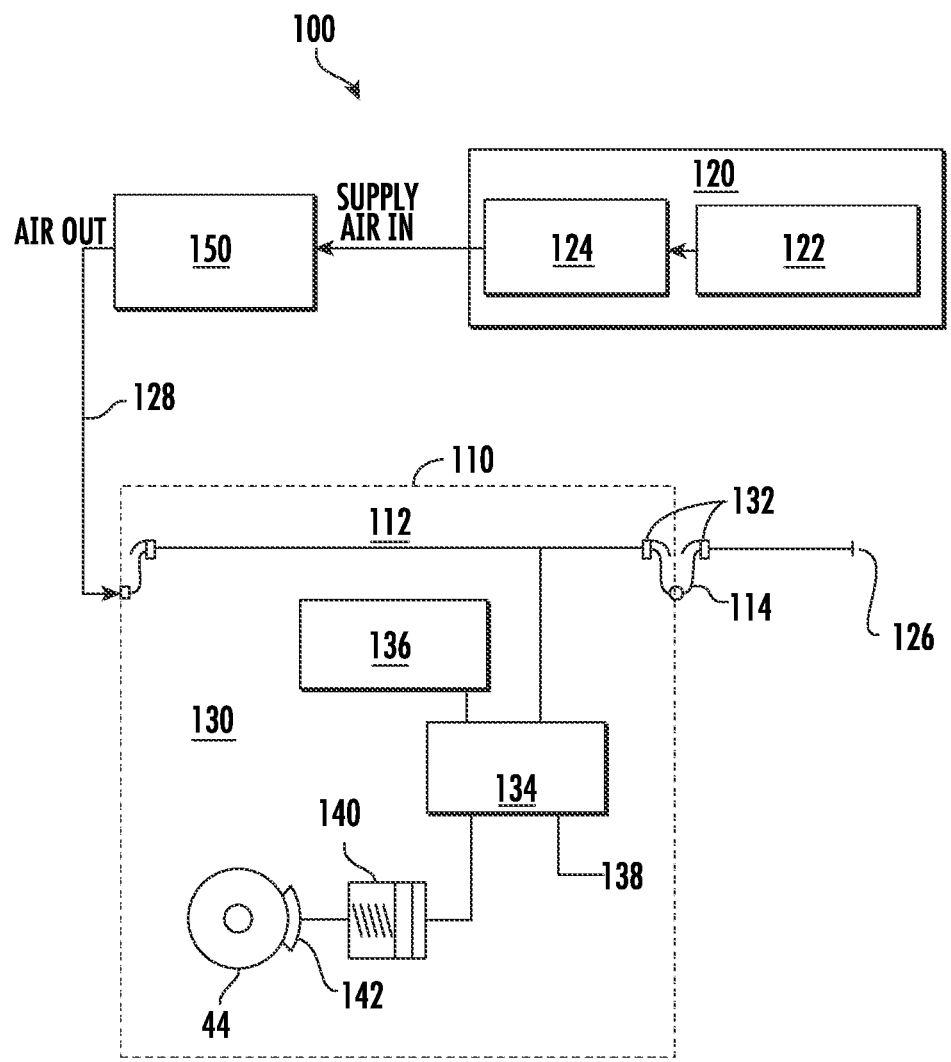
Figure 3:
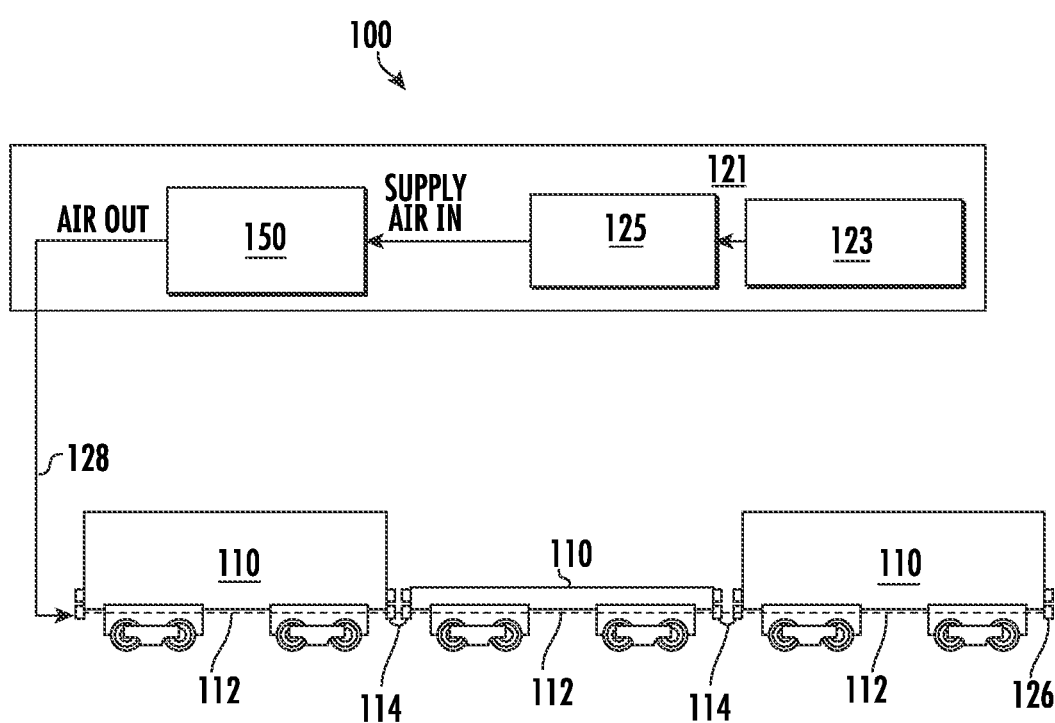
Figure 4:
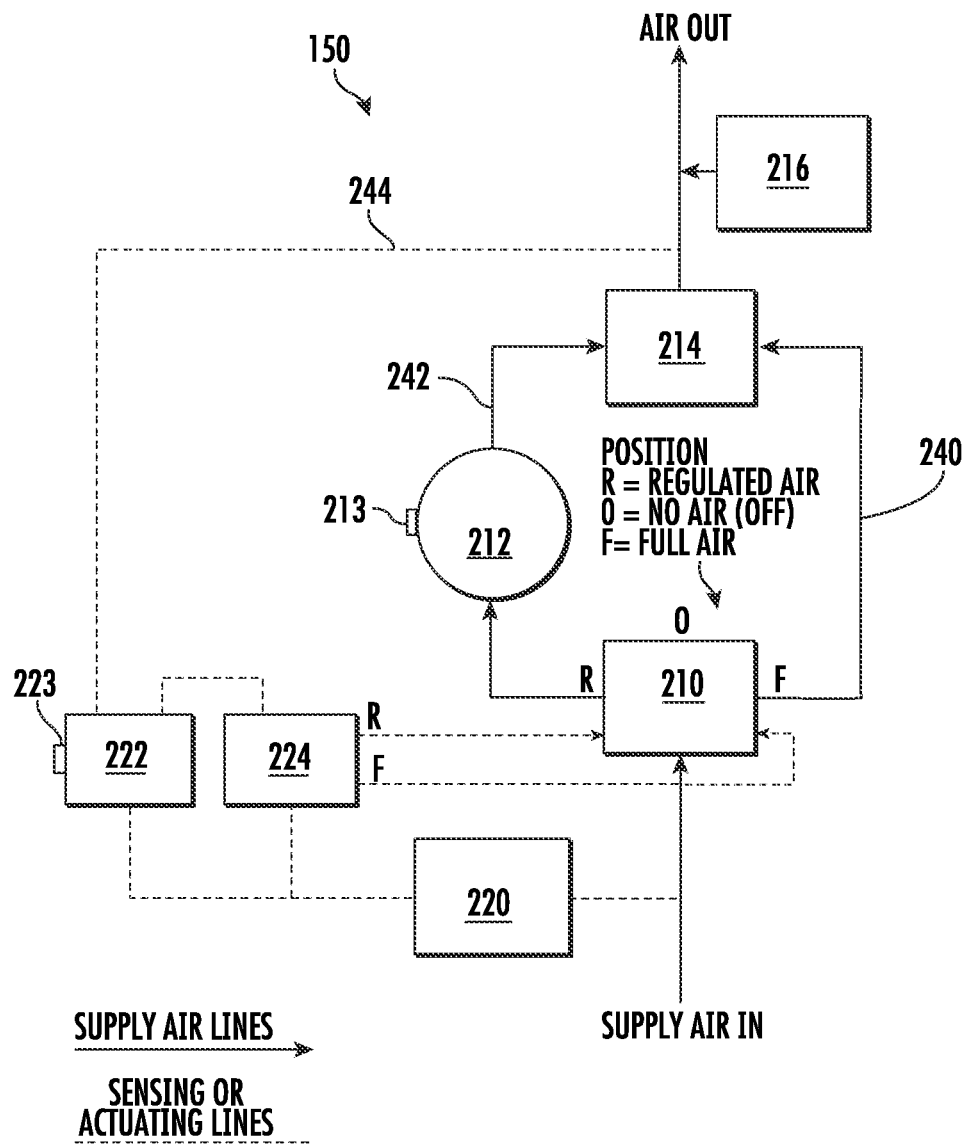
Figure 5:
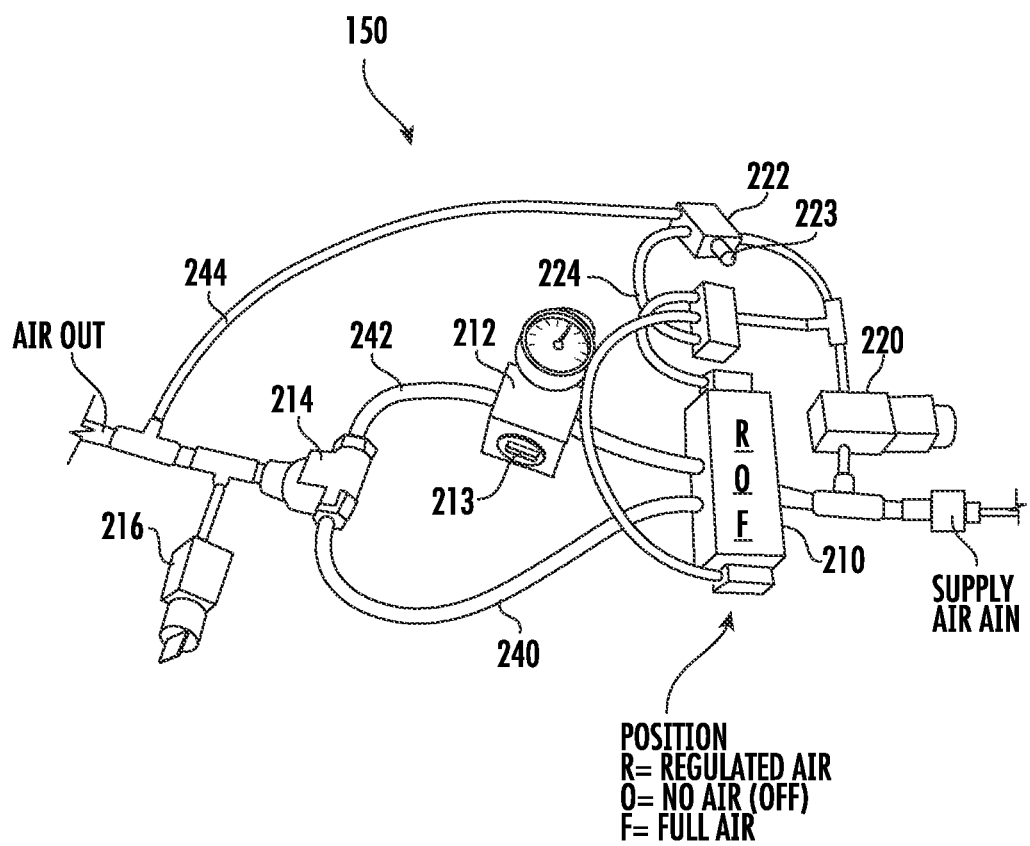
Figure 6A:
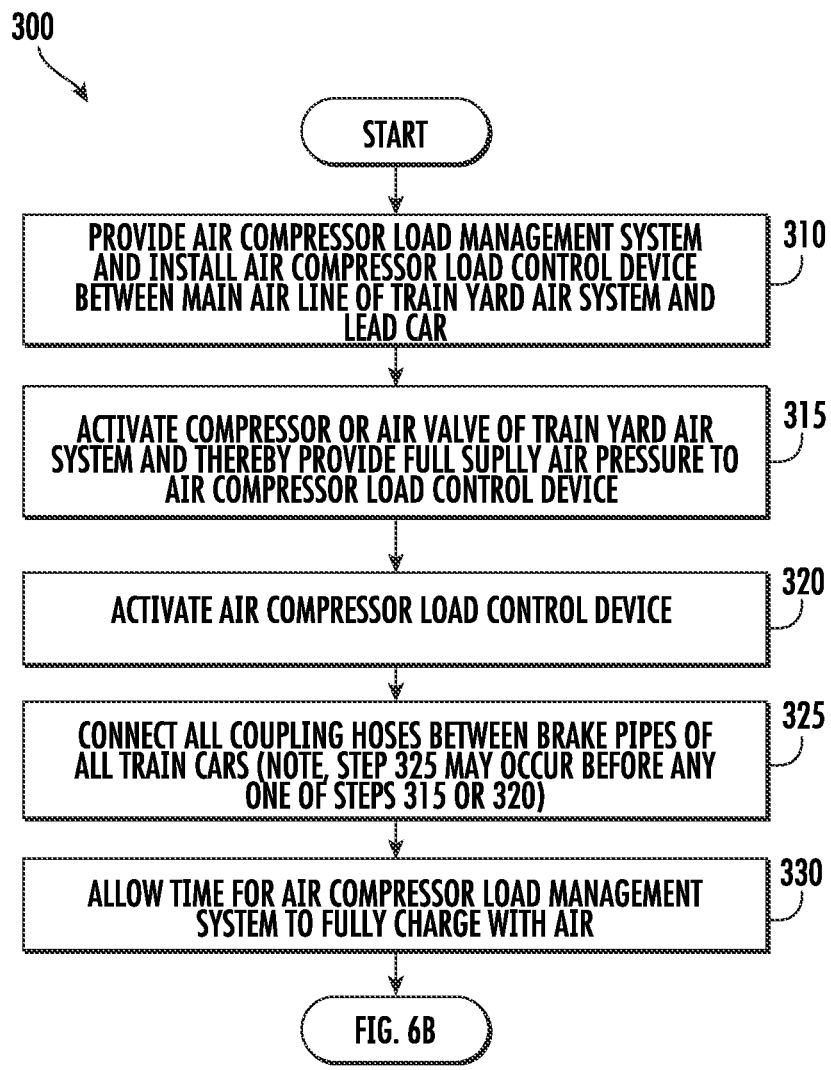
Figure 7:
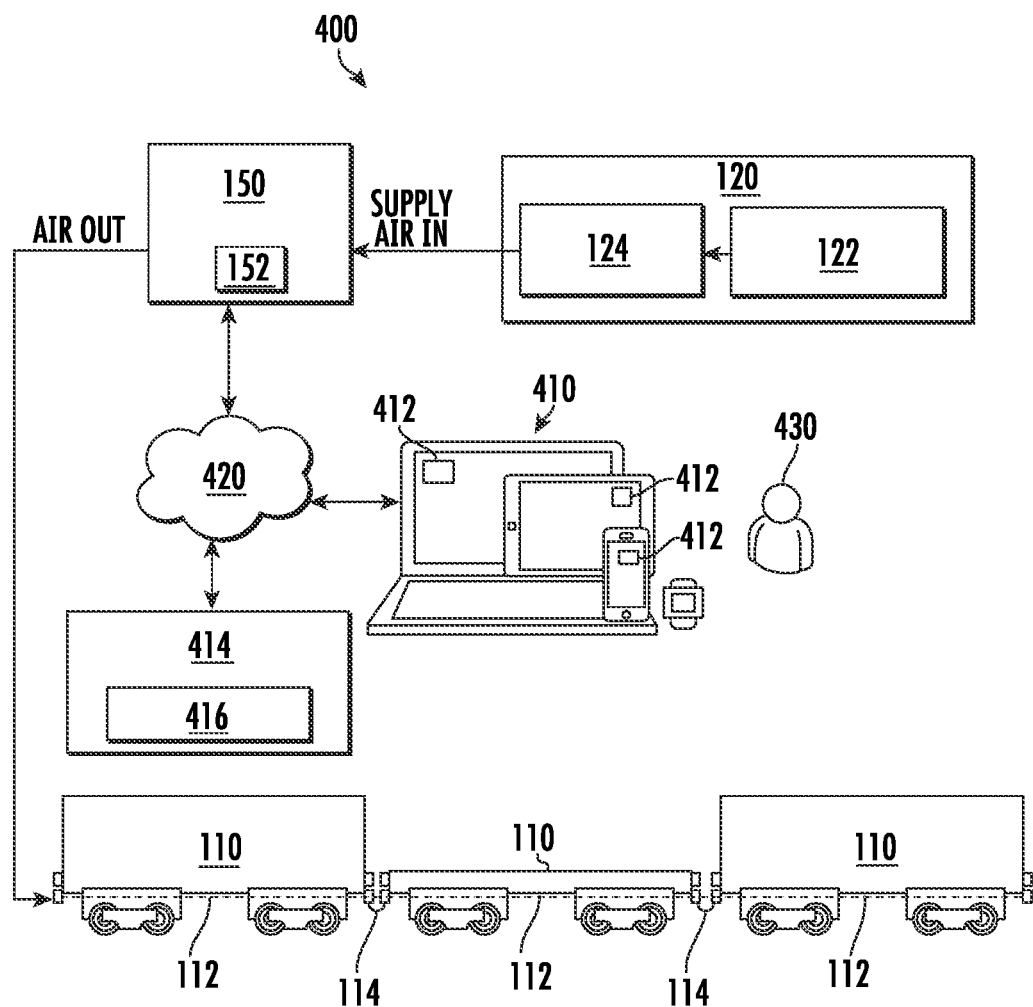

Having thus described the presently disclosed subject matter in general terms, reference will now be made to the accompanying drawings, which are not necessarily drawn to scale, and wherein:

FIG. 1, FIG. 2, and FIG. 3 illustrate block diagrams of examples of the presently disclosed air compressor load management system including an air compressor load control device for use in a train car brake testing process;

FIG. 4 illustrates a schematic diagram of an example of an air compressor load control device of the presently disclosed air compressor load management system;

FIG. 5 shows a photo of an example of a physical instantiation of the air compressor load control device shown in FIG. 4;

FIG. 6A and FIG. 6B illustrate a flow diagram of an example of a method of using the presently disclosed air compressor load management system including an air compressor load control device with respect to a train car brake testing process; and FIG. 7 illustrates a block diagram of an example of the presently disclosed air compressor load management system provided in a network environment.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides an air compressor load management system and method including an air compressor load control (or management) device for use in a train car brake testing process.

In some embodiments, the presently disclosed air compressor load management system and method provide an air compressor load control (or management) device that may be used to automatically adjust the air out pressure in a train yard air system based on sensing whether the system is open or closed, such as whether the system is vented to atmosphere or not.

In some embodiments, the presently disclosed air compressor load management system and method provide an air compressor load control (or management) device that during a train car brake testing process may be used to do one or more of (1) sense that the system is vented to atmosphere and then automatically drop the air out pressure (i.e., regulate down the air out pressure), (2) sense that the system is closed and then automatically supply full air out pressure (i.e., regulate up the air out pressure to normal (or set) pressure of yard air system); and/or (3) may sense that the system is vented to atmosphere for an extended period of time and then automatically turn off the air supply.

In some embodiments, the presently disclosed air compressor load management system and method provide an air compressor load control (or management) device that during a train car brake testing process may be used to increase energy efficiency by automatically adjusting the load on the air compressor based on sensing whether the system is open or closed, such as whether the system is vented to atmosphere or not.

In some embodiments, the presently disclosed air compressor load management system and method provide an air compressor load control (or management) device that during a train car brake testing process may be used to sense the presence of a break in the compressed air supply after it has been charged to full pressure and then automatically drop the air out pressure (i.e., regulate down the air out pressure).

In some embodiments, the presently disclosed subject matter provides an air compressor load management system and method including an air compressor load control (or management) device and operating in a network environment.

In some embodiments, the air compressor load control (or management) device of the presently disclosed air compressor load management system may include, for example, an air flow portion and a sensing portion. The air flow portion may include, for example, a main valve, a regulator, a shuttle valve, and optionally a brake test device and wherein the main valve may have a "full air" position, a "regulated air" position, and a "no air" position. The sensing portion may include, for example, a system ON/OFF valve, a sensing block, and a control (or actuating) block.

Further, a method of using the presently disclosed air compressor load management system including the air compressor load control device with respect to a train car brake testing process is provided.

Further, a benefit of the presently disclosed air compressor load management system and method including an air compressor load control (or management) device may be that it can be used to minimize the stress on an air compressor, which may minimize maintenance on the compressor and maximize its lifespan.

Further, while the presently disclosed air compressor load management system and method including an air compressor load control (or management) device may be described hereinbelow with respect to a rail yard air system, air compressor load management system and method is not limited for use in train car brake testing. This is exemplary only. The presently disclosed air compressor load management system and method including an air compressor load control (or management) device may be used in any air system application in which it is desirable to drop air supply pressure when the system is open.

Referring now to FIG. 1, FIG. 2, and FIG. 3 is block diagrams of examples of the presently disclosed air compressor load management system 100 including an air compressor load control device for use in a train car brake testing process.

In one example, FIG. 1 shows that air compressor load management system 100 may include a line of multiple train cars 110 (e.g., freight cars). In this example, the multiple train cars 110 may be arranged for receiving a brake test (e.g., Initial Terminal Test or Class 1 test) to ensure that 100% of the brakes are working on the individual train cars 110 before leaving a terminal. This test may be performed by a Qualified Mechanical Inspector (QMI) without the locomotives through use of a yard air system, such as a train yard air system 120. Train yard air system 120 may include, for example, a train yard compressor 122 that supplies a main reservoir 124, which is a reservoir of compressed air. Train yard compressor 122 is an air compressor that may be used to charge main reservoir 124 up to, for example, about 80 psi of supply air pressure.

Train yard air system 120 may supply compressed air to the line of multiple train cars 110. Each of the train cars 110 may have a brake pipe 112. Brake pipe 112 is the compressed air line that is fluidly coupled to the brake system of the train car 100. An example of the train car 100 brake system is shown hereinbelow with reference to FIG. 2. Brake pipes 112 from one train car 110 to the next are fluidly coupled via coupling hoses 114. In this way, the brake pipes 112 are coupled in series and the supply air from train yard air system 120 supplies the entire line of the multiple train cars 110.

A conventional yard air system supplies compressed air directly to the train cars (e.g., train cars 110). However, in the presently disclosed air compressor load management system 100, an air compressor load control (or management) device 150 is provided in the air flow path between train yard air system 120 and the line of train cars 110. In this example, train yard air system 120 supplies a SUPPLY AIR IN input of air compressor load control device 150. Further, an AIR OUT output of air compressor load control device 150 supplies a main air line 128 that couples to the brake pipe 112, for example, of a train car 110 to be tested, for example, the first train car 110 in the line.

During a train car brake testing process, air compressor load control device 150 may be used to automatically adjust the air pressure provided through main air line 128 based on sensing whether the system is open or closed, such as whether train yard air system 120 is vented to atmosphere or not. Accordingly, air compressor load management system 100 may include a vent 126. Vent 126 may be representative of any intentional or unintentional escape or leaking of air anywhere within air compressor load management system 100. For example, at the beginning of the brake test, it may be possible that not all coupling hoses 114 are connected. In this example, the first missing or unconnected coupling hose 114 in the lines creates a vent 126 that is vented to atmosphere. Accordingly, train yard air system 120 may be vented to atmosphere or not based on whether an open vent 126 is present or not. By way of example, FIG. 1, FIG. 2, and FIG. 3 show train yard air system 120 is vented to atmosphere at the last train car 110 (e.g., see vent 126).

In air compressor load management system 100, the presence of air compressor load control device 150 during a train car brake testing process allows the energy efficiency of the air compressor (e.g., train yard compressor 122) to be increased by automatically adjusting the load on the air compressor based on sensing whether the system is open or closed, such as whether the system is vented to atmosphere or not.

FIG. 2 shows more details of the presently disclosed air compressor load management system 100 that includes air compressor load control device 150. Namely, FIG. 2 shows more details of an example brake system 130 of a typical train car 110. For example, in brake system 130, the brake pipes 112 and coupling hoses 114 may be securely coupled together using angle cocks 132. Further, in each train car 110, brake pipe 112 may supply one input of a triple valve 134 while an auxiliary reservoir 136 may supply a second input of triple valve 134. Auxiliary reservoir 136 may be a reservoir of compressed air that is local to brake system 130. In this example, an output of triple valve 134 may be used to actuate a brake cylinder 140. In turn, brake cylinder 140 may be used to actuate a brake block 142 against a train car wheel 144. Triple valve 134 may have another output, which is an exhaust 138. Generally, the three functions of triple valve 134 are (1) to charge auxiliary reservoir 136, (2) to apply the brakes, and (3) to release the brakes, as is well known.

Accordingly, in air compressor load management system 100, air compressor load control device 150 is used in the process of testing brake system 130 of each of the train cars 110.

In another example, when performing brake tests and inspections, many QMI's prefer to "carry air" with them instead of using the yard air system (e.g., train yard air system 120). Accordingly, FIG. 3 shows that, instead of including train yard air system 120, air compressor load management system 100 may include a brake test unit 121 that includes its own brake test compressor 123 and brake test reservoir 125, along with air compressor load control device 150. In one example, brake test compressor 123, brake test reservoir 125, and air compressor load control device 150 may be integrated together as a single portable brake test unit 121. In another example, brake test unit 121 may include brake test compressor 123 and brake test reservoir 125 only, and air compressor load control device 150 may be provided separately.

Referring now to FIG. 4 is a schematic diagram of an example of an air compressor load control device 150 of the presently disclosed air compressor load management system 100. Further to the example, FIG. 5 is a photo of an example of a physical instantiation of the air compressor load control device 150 shown in the schematic diagram of FIG. 4.

In this example, air compressor load control device 150 may include an air flow portion and a sensing portion. For example, the air flow portion of air compressor load control device 150 may include a main valve 210, a regulator 212, a shuttle valve 214, and optionally a brake test device 216. The SUPPLY AIR IN supplies an input of main valve 210. Main valve 210 may be, for example, a 5-way, 3-position switch that controls the flow path of the SUPPLY AIR IN. In one example, the SUPPLY AIR IN is the yard supply air from train yard air system 120 and wherein the supply pressure may be in the range from about 80 psi to about 90 psi. For example, main valve 210 has a non-regulated path that supplies a full pressure line 240 to a first input of shuttle valve 214. This is referred to as the "full air" position of main valve 210. Next, main valve 210 has a regulated path that supplies regulator 212. Then, an output of regulator 212 supplies a regulated pressure line 242 to a second input of shuttle valve 214. This is referred to as the "regulated air" position of main valve 210. Next, main valve 210 has an off or "no air" position. The output of shuttle valve 214 supplies the AIR OUT of air compressor load control device 150. In air compressor load management system 100, the AIR OUT of air compressor load control device 150 may supply main air line 128.

Regulator 212 is a device that receives air at a certain pressure and then dispenses air a lower pressure. In air compressor load control device 150, regulator 212 may be pre-set to drop supple pressure to a desired threshold. That is, regulator 212 may be used to regulate down the AIR OUT pressure. The pressure threshold of regulator 212 may be set using an adjuster 213 (e.g., a rotatable knob). In one example, regulator 212 receives air from main valve 210 at in the range of from about 80 psi to about 90 psi of pressure and then dispenses air at in the range of from about 15 psi to about 20 psi of pressure to shuttle valve 214.

Shuttle valve 214 is a type of valve which allows fluid to flow through it from one of two sources. In air compressor load control device 150, shuttle valve 214 allows fluid to flow through it from either full pressure line 240 or regulated pressure line 242. Shuttle valve 214 acts as a check valve to keep air from back feeding one side of the system when the other side is in used.

Further, the optional brake test device 216 may be fluidly coupled to the AIR OUT of air compressor load control device 150. Brake test device 216 may provide a vent valve and certified gauge used to perform Class I brake tests in rail yards. For example, a valve of brake test device 216 may be opened to release air from system. Namely, it may be used to pull air from main air line 128.

Additionally, the sensing portion of air compressor load control device 150 may include a system ON/OFF valve 220, a sensing block 222, and a control (or actuating) block 224. When system ON/OFF valve 220 is off, main valve 210 is set to the "no air" position. When system ON/OFF valve 220 is on, a signal is sent to sensing block 222 and control block 224 to operate the system.

Sensing block 222 may be, for example, an arrangement of switch valves that may be used to "sense" the downstream pressure. For example, a sensing line 244 is provided between sensing block 222 and the AIR OUT output of air compressor load control device 150. In one example, sensing block 222 may contain a 5/2 valve and 3/2 valve. In sensing block 222, the combination of valves uses spring return and air actuation. For example, spring tension on the valves is set to the threshold pressure. The threshold pressure of sensing block 222 may be set using an adjuster 223 (e.g., a rotatable knob).

In one example, control (or actuating) block 224 may be, for example, a pilot valve that may be used to actuate main valve 210 (e.g., a 5-way 3-position valve) to supply either full or regulated pressure based on threshold pressure of sensing block 222.

Generally, the operation of air compressor load control device 150 of the presently disclosed air compressor load management system 100 may be as follows. Air compressor load control device 150 uses various pneumatic valves to sense the pressure in the downstream system, which is main air line 128 feeding train cars 110. Main air line 128 is supplied by the AIR OUT output of air compressor load control device 150. In the event that the pressure at AIR OUT may drop below a pre-set threshold pressure, this means that the system is open and/or vented to atmosphere. In this case, the supply air (i.e., the AIR OUT) may be regulated to a lower pressure. By contrast, when the pressure at AIR OUT rises above the pre-set threshold pressure, this means that the system is closed. In this case, the supply air (i.e., the AIR OUT) may be automatically switched to full supply pressure. More details of an example of a method of using the presently disclosed air compressor load management system 100 including air compressor load control device 150 are shown and described hereinbelow with reference to FIG. 6A and FIG. 6B.

Additionally, air compressor load control device 150 may be used to sense that the system is vented to atmosphere for an extended period of time and then may automatically turn off the air supply (e.g., turn off air compressor load control device 150, train yard compressor 122, or brake test compressor 123).

Further and referring now again to FIG. 1 through FIG. 5, while air compressor load control device 150 has been described hereinabove with reference to including pneumatically sensed, signaled, and/or actuated valves, other types of valves are possible. For example, air compressor load control device 150 may be electronically sensed, signaled, and/or actuated. Whether pneumatically sensed, signaled, and/or actuated or electronically sensed, signaled, and/or actuated, the basic operation may be substantially the same. Further, the electronic version may also include remote monitoring and operation capabilities.

Referring now to FIG. 6A and FIG. 6B is a flow diagram of an example of a method 300 of using the presently disclosed air compressor load management system 100 including air compressor load control device 150 with respect to a train car brake testing process. Method 300 may include, but is not limited to, the following steps.

At a step 310, the presently disclosed air compressor load management system 100 is provided and air compressor load control device 150 is installed within main air line 128 of train yard air system 120. Preferably, the regulator air pressure and the output threshold pressure level are pre-set in the air compressor load control device 150. For example, and referring now to FIG. 4, with the expected SUPPLY AIR IN pressure being, for example, about 80 psi the output pressure of regulator 212 may have been pre-set to about 20 psi (using adjuster 213). Accordingly, regulated pressure line 242 will have about 20 psi of pressure. Additionally, if the expected SUPPLY AIR IN pressure is about 80 psi and regulator 212 output pressure was pre-set to about 20 psi, then using sensing block 222 and adjuster 223, the output threshold pressure level may be pre-set to about 20 psi. Sensing line 244 monitors the AIR OUT against this preset output threshold pressure level to control main valve 210 of air compressor load control device 150. In one example, air compressor load control device 150 may be installed downstream of main reservoir 124 and upstream of the first train car 110 in the line, as shown in FIG. 1. Accordingly, main reservoir 124 supplies the SUPPLY AIR IN input of air compressor load control device 150 and the AIR OUT output of air compressor load control device 150 supplies main air line 128. Alternatively, air compressor load control device 150 is installed within main air line 128 of brake test unit 121. For example, air compressor load control device 150 may be installed downstream of brake test reservoir 125 and upstream of the first train car 110 in the line, as shown in FIG. 3. Accordingly, in this alternate example, main reservoir 124 supplies the SUPPLY AIR IN input of air compressor load control device 150 and the AIR OUT output of air compressor load control device 150 supplies main air line 128. Method 300 proceeds to step 315.

At a step 315, the train yard compressor 122 (or air valve) of train yard air system 120 (or alternatively, brake test compressor 123 of brake test unit 121), may be activated and thereby provide full supply air pressure to air compressor load control device 150. Method 300 proceeds to step 320.

At a step 320, the air compressor load control device 150 may be activated and its main valve 210 may be set to the "full air" position. For example, using system ON/OFF valve 220, the air compressor load control device 150 may be activated and the main valve 210 may be switched from the "no air" position to the "full air" position. Accordingly, air at full pressure is delivered to shuttle valve 214, then to AIR OUT of air compressor load control device 150, and then to main air line 128. Method 300 proceeds to step 325.

At a step 325, a user, such as a QMI, may connect all coupling hoses 114 between the brake pipes 112 of all the train cars 110, and connect the main air line 128 to, for example, the first train car 110. Alternatively, the user (QMI), may connect the main air line 128 to, for example, the first train car 110 and then connect all coupling hoses 114 between the brake pipes 112 of all the train cars 110. Note, step 325 may occur before any one of steps 315 or 320. Method 300 proceeds to step 330 (or 315 or 320).

At a step 330, air compressor load management system 100 is charged with air. For example, the train yard air system 120 (or alternatively brake test unit 121), charges the line of train cars 110 with air, and wherein each train car 110 may have a brake system 130 (see FIG. 2) to be charged with air. Method 300 proceeds to step 335.

At a step 335, it is determined whether the normal (or set) air pressure of, for example, train yard compressor 122 (or alternatively brake test compressor 123), is reached. In one example, the normal (or set) air pressure of train yard compressor 122 (or alternatively brake test compressor 123), may be in the range of from about 80 psi to about 90 psi. This determination may be accomplished using sensing line 244 of air compressor load control device 150. For example, sensing line 244 monitors the AIR OUT against, for example, the pre-set output threshold pressure level, for example, of about 20 psi to determine whether the normal (or set) air pressure of train yard compressor 122 (or alternatively brake test compressor 123) is reached. If sensing line 240 senses about 20 psi of pressure at AIR OUT, then it is determined that the normal (or set) air pressure is reached and method 300 may proceed to a step 340. However, if sensing line 240 senses less than about 20 psi of pressure at AIR OUT, then it is determined that the normal (or set) air pressure is not reached and method 300 may proceed to a step 355.

At a step 340, the AIR OUT pressure is automatically switched to or held at full supply pressure. For example, because the pressure at AIR OUT (at sensing line 244) rises above the pre-set threshold pressure, for example, of about 20 psi of sensing block 222, this is an indicator that the system is closed. As a result, main valve 210 is set to the "full air" position. Accordingly, AIR OUT of air compressor load control device 150 supplies full air pressure (e.g., about 80 psi) to main air line 128 that supplies the line of train cars 110. Method 300 proceeds to step 345.

At a step 345, the user, such as the QMI, proceeds to perform and complete the brake test on all train cars 110. Method 300 proceeds to step 350.

At a step 350, upon completion of the brake test, air compressor load control device 150 and train yard compressor 122 of train yard air system 120 (or alternatively, brake test compressor 123 of brake test unit 121), may be deactivated. Method 300 ends.

At a step 355, the AIR OUT pressure is automatically regulated to a lower pressure. For example, because the pressure at AIR OUT (at sensing line 244) has dropped below the pre-set threshold pressure of, for example, about 20 psi of sensing block 222, this may be an indicator that the system is open (venting to atmosphere). As a result, main valve 210 is automatically set to the "regulated air" position. Accordingly, AIR OUT of air compressor load control device 150 supplies a lower air pressure (e.g., about 20 psi) to main air line 128 that supplies the line of train cars 110. Method 300 proceeds to step 360.

At a step 360, the user, such as a QMI, may investigate the system for any air leaks along the line of train cars 110 and corrects any air leaks that may be found. For example, the QMI may connect and/or repair any coupling hoses 114 that may be leaking air to atmosphere (i.e., providing an open vent 126). In so doing, the air pressure within air compressor load management system 100 rises toward or to the normal (or set) air pressure of train yard compressor 122 (or alternatively, brake test compressor 123), which may be, for example, in the range of from about 80 psi to about 90 psi. Method 300 returns to step 335.

Additionally, throughout the steps of method 300, air compressor load control device 150 may be used to sense that the system is vented to atmosphere for an extended period of time and then automatically turn off air compressor load control device 150 and/or train yard compressor 122 of train yard air system 120 (or alternatively, brake test compressor 123 of brake test unit 121).

Referring now to FIG. 7 is a block diagram of an example of the presently disclosed air compressor load management system 400 provided in a network environment. Air compressor load management system 400 may include train yard air system 120 (or alternatively brake test unit 121), air compressor load control device 150, and the line of multiple train cars 110 as described hereinabove with reference to air compressor load management system 100 shown in FIG. 1 through FIG. 6B.

Additionally, air compressor load management system 400 may include one or more computing devices 410 and a networked computer 414. Additionally, air compressor load control device 150, computing devices 410, and networked computer 414 may be in communication via a network 420. Networked computer 414 may be, for example, any centralized server or cloud-based server. Network 420 may be, for example, a local area network (LAN) or wide area network (WAN) for connecting to the internet.

Additionally, air compressor load control device 150 may include a communications interface 152. Communications interface 152 may be any wired and/or wireless communication interface for connecting to network 420 and by which information may be exchanged with computing devices 410 and/or networked computer 414. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, cellular networks, ISM, Bluetooth® technology, Bluetooth® Low Energy (BLE) technology, Wi-Fi, Wi-Max, IEEE 402.11 technology, ZigBee technology, Z-Wave technology, 6LoWPAN technology (i.e., IPv6 over Low Power Wireless Area Network (6LoW- PAN)), ANT or ANT+(Advanced Network Tools) technology, radio frequency (RF), Infrared Data Association (IrDA) compatible protocols, Local Area Networks (LAN), Wide Area Networks (WAN), Shared Wireless Access Protocol (SWAP), any other types of wireless networking protocols, and any combinations thereof.

Computing devices 410 may be, for example, a general-purpose computer, special purpose computer, personal computer, microprocessor, or other programmable data processing apparatus. Computing devices 410 may be, for example, a desktop computer, laptop computer, tablet device, smartphone or mobile phone, smartwatch, and the like.

Further, data storage may be built into or provided separate from air compressor load control device 150, computing devices 410, and/or networked computer 414. In one example, train data 416 may be stored on networked computer 414. Train data 416 may include any information generated or used by air compressor load management system 400. For example, train data 416 may include system health information, system activity information, system audit information, Class 1 brake test documentation, and the like.

Additionally, users 430 may be associated with air compressor load management system 400. In one example, a user 430 may be a QMI who is conducting a brake test on the line of train cars 110. Further, a desktop application 412 and/or mobile app 412 may be loaded and running on computing devices 410. Desktop application 412 and/or mobile app 412 may provide a user interface (e.g., dashboard) for operating air compressor load management system 400. In particular, desktop application 412 and/or mobile app 412 may be used by QMI users 430 for operating air compressor load management system 400 when conducting train car brake tests. Further, desktop application 412 and/or mobile app 412 may be use for monitoring air compressor load management system 400 remotely.

In summary and referring now again to FIG. 1 through FIG. 7, in some embodiments, the presently disclosed air compressor load management system 100, air compressor load control device 150, and method 300 may be used to automatically adjust the air out pressure in a train yard air system based on sensing whether the system is open or closed, such as whether the system is vented to atmosphere or not.

Further, in some embodiments, the presently disclosed air compressor load management system 100, air compressor load control device 150, and method 300 may be used during a train car brake testing process to one or more of (1) sense that the system is vented to atmosphere and then automatically drop the air supply pressure (i.e., regulate down the air out pressure), (2) sense that the system is closed and then automatically supply full air out pressure (i.e., regulate up the air out pressure to normal pressure of yard air system); and/or (3) may sense that the system is vented to atmosphere for an extended period of time and then automatically turn off the air supply.

Further, in some embodiments, the presently disclosed air compressor load management system 100, air compressor load control device 150, and method 300 may be used during a train car brake testing process to increase energy efficiency by automatically adjusting the load on the air compressor based on sensing whether the system is open or closed, such as whether the system is vented to atmosphere or not.

Further, in some embodiments, the presently disclosed air compressor load management system 100, air compressor load control device 150, and method 300 may be used during a train car brake testing process to sense the presence of a break in the compressed air supply after it has been charged to full pressure and then automatically drop the air out pressure (i.e., regulate down the air out pressure).

Further, in some embodiments, the presently disclosed air compressor load management system 400, air compressor load control device 150, and method 300 may be operating in a network environment.

Further, in some embodiments, a benefit of the presently disclosed air compressor load management system 100, air compressor load control device 150, and method 300 may be that it can be used to minimize the stress on an air compressor, which may minimize maintenance on the compressor and maximize its lifespan.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. An air compressor load control device, comprising:
   a. a supply air inlet;
   b. a first valve in fluid communication with the supply air inlet;
   c. a controller in operative communication with the first valve;
   d. a sensor in operative communication with the controller;
   e. a regulator in fluid communication with a first outlet of the first valve;
   f. a second valve in fluid communication with an outlet of the regulator via a first inlet of the second valve, and the second valve further in fluid communication with a second outlet of the first valve via a second inlet of the second valve;
   g. a supply air outlet in fluid communication with an outlet of the second valve;
   h. a sensing line in fluid communication with the supply air outlet at a first end and the sensor at a second end, wherein the sensor is configured to sense an air pressure at the supply air outlet, and wherein depending on the sensed air pressure at the supply air outlet the sensor signals the controller to cause the first valve to one of send air received from the supply air inlet directly to the second inlet of the second valve, to not send any air, or to send air received from the supply air inlet to the regulator upon the sensor sensing the air pressure at the supply air outlet is below a pre-set pressure threshold wherein the regulator is configured to regulate down the air pressure of air at the supply air outlet to a pre-set reduced air pressure; and
   i. at least one of a first adjuster operatively connected to the sensor for adjusting the pre-set pressure threshold and a second adjuster operatively connected to the regulator for adjusting the regulated pre-set reduced air pressure.

2. The air compressor load control device of claim 1, wherein the pre-set pressure threshold is an air pressure indicative of the supply air exiting the supply air outlet being vented to atmosphere.

3. The air compressor load control device of claim 1, wherein the controller is configured to automatically cause the first valve to direct air received from the supply air inlet to the second inlet of the second valve based on the sensor sensing the air pressure at the supply air outlet is at or above a pre-set pressure threshold.

4. The air compressor load control device of claim 1, wherein the controller is configured to automatically cause the first valve to not send any air received from the supply air inlet based on the sensor sensing the air pressure at the supply air outlet is below a pre-set pressure threshold for a pre-set amount of time.

5. The air compressor load control device of claim 1, wherein the first valve comprises a main valve and the second valve comprises a shuttle valve.

6. The air compressor load control device of claim 1, wherein the supply air inlet is in fluid communication with a compressed air supply reservoir.

7. The air compressor load control device of claim 1, wherein the second valve is configured to provide an air pathway from one of either the outlet of the regulator or the second outlet of the first valve, while closing the air pathway of the other one of the second outlet of the first valve or the outlet of the regulator.

8. The air compressor load control device of claim 1, wherein the first valve selectively provides one of a full or a pre-set pressure supply air path, a regulated pressure supply air path, or a closed supply air path.

9. The air compressor load control device of claim 1, further comprises an on/off valve, wherein when the on/off valve is set to off the first valve is automatically set to not send any air, and when the on/off valve is set to on a signal is sent to the sensor and controller to operate the device and the first valve is automatically set to send air to the regulator or directly to the second valve based on the sensed air pressure at the supply air outlet.

10. The air compressor load control device of claim 1, wherein the air outlet is configured to operatively engage with a brake testing device.

11. The air compressor load control device of claim 1, wherein the first inlet of the second valve is connected to the outlet of the regulator via a regulated pressure air line, and the second inlet of the second valve is connected to the second outlet of the first valve via a full pressure air line.

12. The air compressor load control device of claim 1, further comprises a communications interface, wherein the communications interface is configured for connecting to a network for communicating data with a computing device and/or a networked computer.

13. An air compressor load management system, comprising:
   a. a compressed supply air reservoir; and
   b. an air compressor load control device in fluid communication with the compressed supply air reservoir, the air compressor load control device comprising:
      i. a supply air inlet;
      ii. a first valve in fluid communication with the supply air inlet;
      iii. a controller in operative communication with the first valve;
      iv. a sensor in operative communication with the controller;
      v. a regulator in fluid communication with a first outlet of the first valve;
      vi. a second valve in fluid communication with an outlet of the regulator via a first inlet of the second valve, and the second valve further in fluid communication with a second outlet of the first valve via a second inlet of the second valve;
      vii. a supply air outlet in fluid communication with an outlet of the second valve;
      viii. sensing line in fluid communication with the supply air outlet at a first end and the sensor at a second end, wherein the sensor is configured to sense an air pressure at the supply air outlet, and wherein depending on the sensed air pressure at the supply air outlet the sensor signals the controller to cause the first valve to one of send air received from the supply air inlet directly to the second inlet of the second valve, to not send any air, or to send air received from the supply air inlet to the regulator upon the sensor sensing the air pressure at the supply air outlet is below a pre-set pressure threshold wherein the regulator is configured to regulate down the air pressure of air at the supply air outlet to a pre-set reduced air pressure; and
      ix. at least one of a first adjuster operatively connected to the sensor for adjusting the pre-set pressure threshold and a second adjuster operatively connected to the regulator for adjusting the regulated pre-set reduced air pressure.

14. The air compressor load management system of claim 13, further comprising a brake testing device operatively connected to the supply air outlet.

15. The air compressor load management system of claim 14, wherein the brake testing device comprises a train brake testing device.

16. The air compressor load management system of claim 15, further comprising an air compressor operatively engaged with the compressed supply air reservoir, wherein the air compressor is configured to charge the compressed supply air reservoir.

17. The air compressor load management system of claim 13, wherein the air compressor load control device further comprises a communications interface, wherein the communications interface is configured for connecting to a network for communicating data with a computing device and/or a networked computer.

18. The air compressor load management system of claim 17, further comprising one or more computing devices and a networked computer, wherein the one or more computing devices and networked computer are in communication via a network.

19. A method of using an air compressor load management system, comprising:
   a. providing an air compressor load control device, comprising:
      i. a supply air inlet;
      ii. a first valve in fluid communication with the supply air inlet;
      iii. a controller in operative communication with the first valve;
      iv. a sensor in operative communication with the controller;
      v. a regulator in fluid communication with a first outlet of the first valve;
      vi. a second valve in fluid communication with an outlet of the regulator via a first inlet of the second valve, and the second valve further in fluid communication with a second outlet of the first valve via a second inlet of the second valve;
      vii. a supply air outlet in fluid communication with an outlet of the second valve;
      viii. sensing line in fluid communication with the supply air outlet at a first end and the sensor at a second end, wherein the sensor is configured to sense an air pressure at the supply air outlet, and wherein depending on the sensed air pressure at the supply air outlet the sensor signals the controller to cause the first valve to one of send air received from the supply air inlet directly to the second inlet of the second valve, to not send any air, or to send air received from the supply air inlet to the regulator upon the sensor sensing the air pressure at the supply air outlet is below a pre-set pressure threshold wherein the regulator is configured to regulate down the air pressure of air at the supply air outlet to a pre-set reduced air pressure; and
      iv. at least one of a first adjuster operatively connected to the sensor for adjusting the pre-set pressure threshold and a second adjuster operatively connected to the regulator for adjusting the regulated pre-set reduced air pressure;
   b. connecting the air compressor load control device to a compressed air supply at the supply air inlet and to a main air line at the supply air outlet;
   c. connecting the main air line to a brake system to be tested;
   d. charging the air compressor load management system; and
   e. conducting a brake test.

20. The method of claim 19, wherein the method further comprises the air compressor load control device automatically sensing an air pressure at the supply air outlet, and wherein depending on the sensed air pressure sending regulated pressure air, full pressure air, or no air out the supply air outlet.

* * * * *